Oct. 23, 1934.   J. B. WATSON   1,977,657
INTERNAL COMBUSTION ENGINE
Filed Jan. 14, 1931   3 Sheets-Sheet 2
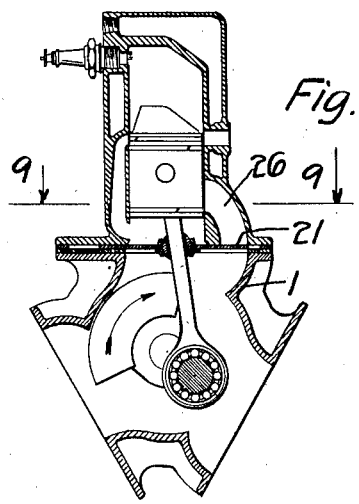
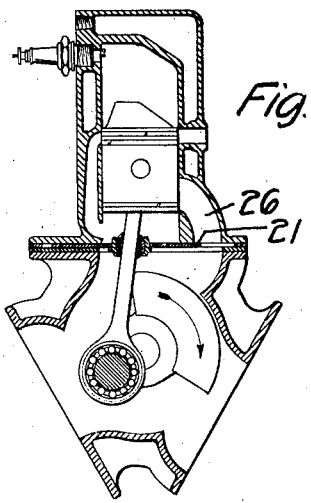
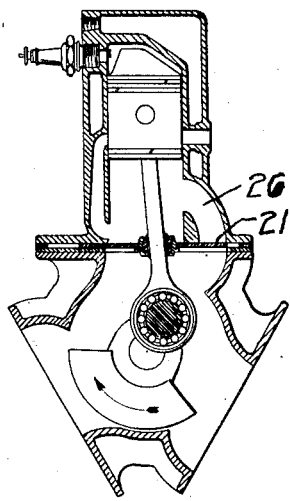
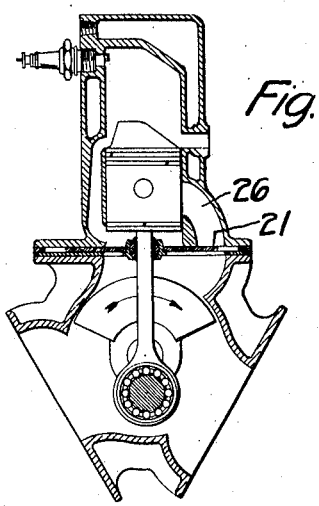
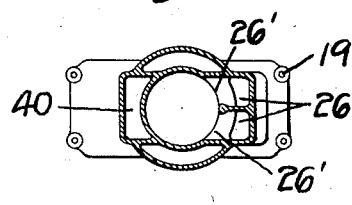
Inventor
James B. Watson

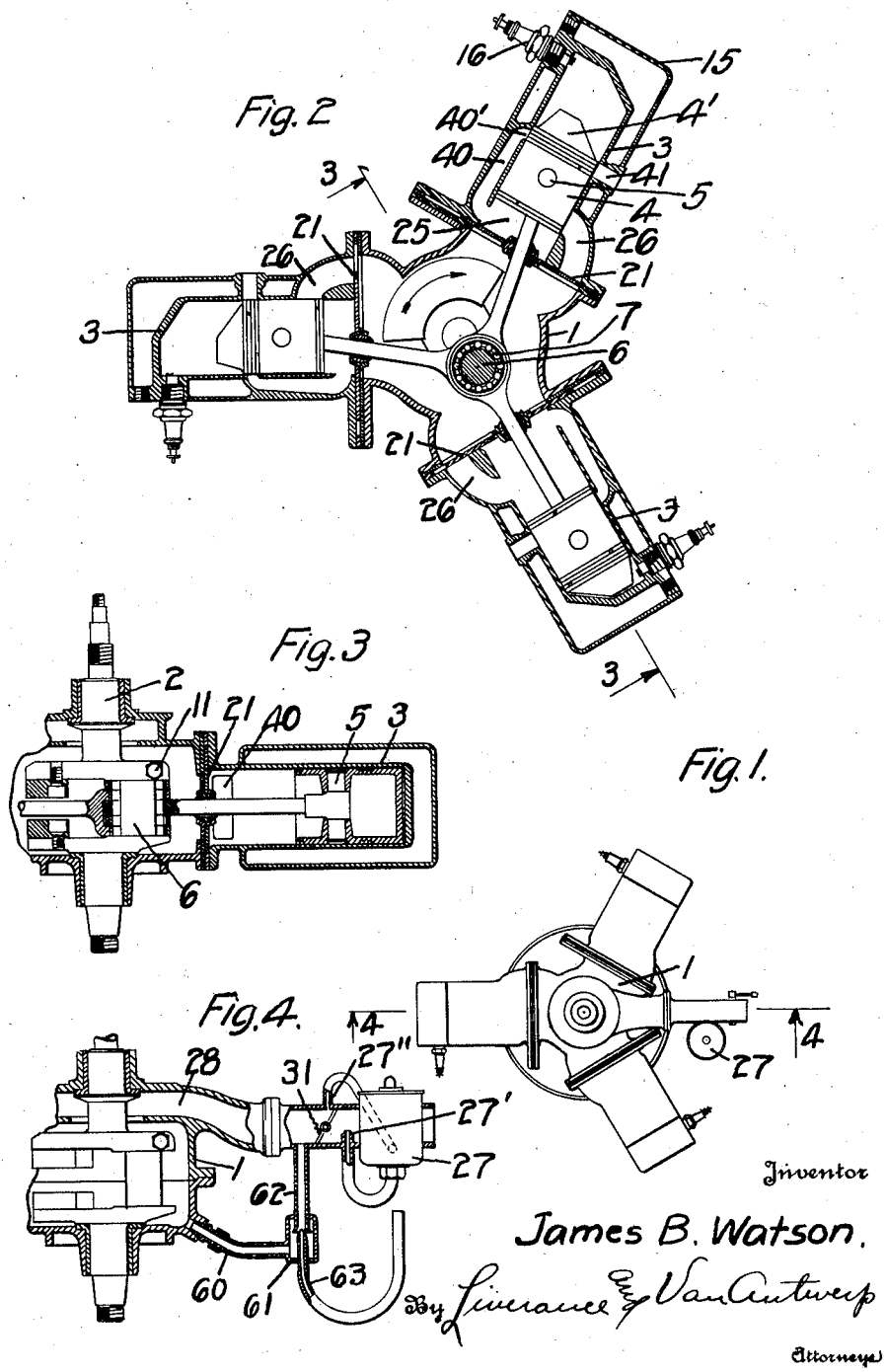

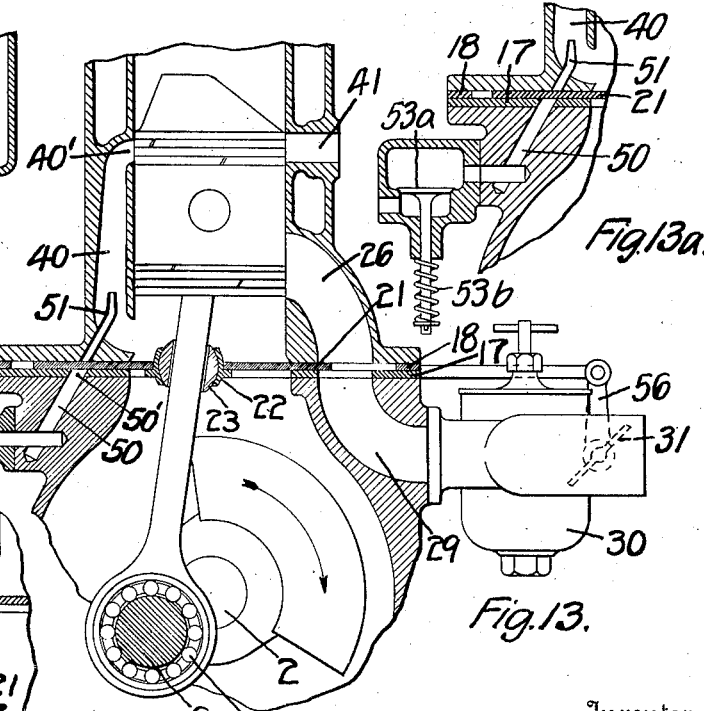

Patented Oct. 23, 1934

1,977,657

UNITED STATES PATENT OFFICE 1,977,657

INTERNAL COMBUSTION ENGINE

James B. Watson, Detroit, Mich., assignor to Frank E. Liverance, Grand Rapids, Mich.

Application January 14, 1931, Serial No. 508,614

30 Claims. (Cl. 123—74)

The present invention relates to internal combustion engines of the two stroke cycle type wherein gaseous fluid is supplied to the combustion chamber or chambers by means of pumping or precompression means operating synchronously with the working pistons; and its principal purpose is to extend the speed range of such engines and to, at the same time, obtain high torque throughout the range, particularly during the higher speeds. This the invention makes possible without increasing the size of the engine and with practically no increase in cost; moreover, it either preserves or increases the ease of starting, flexibility, capacity for being muffled, economy and other desirable characteristics which I have heretofore obtained with two cycle engines involving the precompression principle—see my United States Patent No. 1,741,894, December 31, 1929.

The invention is concerned with three principal features which cooperate in effecting the said desirable results, namely—

(a) means for increasing the quantity of gaseous fluid supplied per stroke, (b) means for supplying a layer of free air interposed between the fresh and burned charges under certain conditions, (c) means for collecting fuel which condenses in the induction system and for returning it thereto in atomized form.

In accordance with feature (a) the invention provides engines wherein the passages which correspond to those that ordinarily restrict the flow of entering mixture are of extraordinarily large cross-section and subject to extremely rapid opening and closing. It also overcomes the limitation, heretofore present in engines of this general type, which grew out of the fact that if the closing of the slide valve of the precompressor was retarded to suit high rotative speeds, the resulting earlier opening of the valve permitted the pressure in the precompression chamber to drop somewhat, thus causing a less effective transferring of mixture to the combustion chamber. Stated otherwise, in engines of this type as heretofore constructed, if the opening of the valve was retarded to hold the valve closed throughout the period the charge was being transferred into the combustion chamber, the valve closing point was advanced to such an extent that the speed range was materially lowered and the engine lost torque rapidly as the higher speeds were approached. In other words, the closing point of the valve was directly dependent on the opening point and vice versa.

In the embodiments of the invention shown, working fluid, which is preferably a mixture of fuel and air, although it may be air alone, is inducted into the precompression chamber through a passage of large cross-section, one end of which enters the cylinder through the side thereof, so as to be opened and closed by the working piston, the passage being also subject to control at another point by a slide valve or the equivalent actuated by the connecting rod. Thus there are two separate points of control for this passage; and the passage, although of large cross-section, as stated above, is opened and closed with great rapidity, the relation of the parts being such that the movement of the piston, which may be said to open the passage, and the movement of the valve, which may be said to close it, is in each instance very rapid at the moment the opening or closing, as the case may be, occurs. This dual control thus permits the designer a wide selection as to where the opening and closing points shall be; and he is also thus enabled to change one without changing the other, thereby permitting a wide range of design and operating characteristics.

In accordance with feature (b) suitable passages and valves, which may be controlled variously, as by direct manual manipulation, interconnection with the throttle, or automatically through the medium of vacuum or by parts movable with the engine, are provided for admitting a jet of fresh air into the connection between the precompression chamber and the combustion chamber when the pressure therein would otherwise draw burned gases back from the combustion chamber and thus interfere with the scavenging operation. This added air prevents the entering fresh mixture from becoming vitiated by the burned gases thus permitting the engine to attain lower speeds, in the preferred constructions, this added air is also supplied generally under conditions of low load thereby improving performance and resulting in increased economy in the use of fuel.

In accordance with feature (c) suitable passages are provided for collecting fuel which condenses in the induction system prior to reaching the pre-compression chamber and for mixing such fuel with fresh air and returning the mixture to the induction system at a point therein beyond the throttle, thereby improving the operation under conditions of low speed, and at sudden opening of the throttle after slow running.

Other objects in the way of simplified construction and the like will appear as the description progresses.

Particularly will it be understood that the invention is applicable not only to radial engines but to the line and V types as well; in other words, it is concerned primarily with single cylinder units regardless of whether used alone or in any of the usual relations to one another.

In the drawings, Fig. 1 is a plan view, parts being removed showing a radial type engine wherein the invention is embodied.

Fig. 2 is a transverse section centrally of the cylinders and on an enlarged scale.

Fig. 3 is a section on line 3—3 of Fig. 2.

Fig. 4 is a section on line 4—4 of Fig. 1.

Fig. 5 is a section showing the relation of the parts as the valve begins to open.

Figs. 6, 7 and 8 are diagrammatic views corresponding to Fig. 5, showing the parts in other positions.

Fig. 9 is a section on line 9—9 of Fig. 5, the piston, connecting rod and valve being removed.

Figs. 10 and 11 are sections showing the shutter valve assembly and the shutter valve seat which appear in Fig. 13 and, except for slight modification, show also the valve and related parts which appear in Figs. 2, 3 and 5 to 8 inclusive.

Fig. 12 is a mid-section of the cylinder, showing the inlet ports in the wall of the precompression chamber.

Fig. 13 is a view similar to Fig. 6, showing a modification. Figs. 13a and 13b show further modifications of the means for supplying fresh air to the passage between the precompression chamber and the combustion chamber.

Fig. 14 shows another modification, in which the fuel and air are supplied separately to the combustion chamber.

Referring to Figs. 1 to 13 inclusive, 1 indicates the crankcase; 2 the crankshaft mounted in suitable bearings therein; 3 the cylinders bolted to the crankcase; 4 the pistons having suitable baffles 4'; 5 the wrist pins; 6 the crank to which the inner ends of the connecting rods are joined. The two outer rods preferably are the same in construction and have their inner ends bifurcated whereas the middle rod is of the blade type; and between the wrist pins and the rods are interposed roller bearings. The crankshaft is preferably divided at the crank in a well understood manner, the sections being held together by suitable means indicated generally by the nut 11. The cylinder is preferably water jacketed as at 15 although air cooling may be employed, and a suitable spark plug appears at 16.

Arranged between the cylinder and the crankcase is a suitable combined valve and shutter device, the construction of which is subject to variation. As shown, (see particularly Figs. 10, 11 and 13) it comprises an inner plate or seat 17, a spacer or cage 18 superposed thereon, and a combined shutter and valve or valve plate 21 which is actuated by the connecting rod to slide back and forth within the cage and which also seats directly on the inner face of the cylinder. It will be understood that the bolts 19 (Fig. 9) whereby the cylinders are secured to the crankcase pass also through the holes 19' and 19'' in the seat 17 and cage 18. The connecting rod is machined to cylindrical cross-section and slides in and out through the bushing 22 fixed to the plate 21, an antifriction bearing 23 being interposed. The seat 17 is slotted at 24 to provide clearance for the connecting rod. The lower or inner end of the cylinder is closed by the valve or shutter 21 to form a primary compression chamber 25, and working fluid—as shown in Figs. 1 to 13b inclusive, a mixture of hydrocarbon and air—is admitted thereto through a passage 26, one end of which is subject to closure by the valve 21 and the other end of which is arranged to be closed by the piston as it approaches the end of its working stroke. In the embodiment of my invention shown in Figs. 1 to 9 inclusive, the passage 26 is supplied with carbureted mixture from the interior of the crankcase which is, in turn, supplied with such mixture by means of the carbureter 27 (Fig. 4) (including a main and low speed fuel nozzle 27' and 27'' shown diagrammatically) and passage 28, the latter preferably entering the crankcase coaxially with the crankshaft; in the construction shown in Fig. 13, however, the passage 26 is supplied with mixture by a passage (or manifold in the case of multi-cylinder installations) 29 and carbureter 30. A suitable throttle valve 31 is used in each instance. It will be seen that the passage 26 is of large cross-section throughout, including the port or ports 26' (Figs. 12 and 14) by which it opens into the primary compression chamber. 40 indicates a delivery passage leading from the lower end portion of the primary compression chamber to the lower portion of the combustion chamber, said delivery passage including the combustion chamber inlet port 40' which is controlled by the piston. The exhaust port appears at 41. It will be noted also that the several passages are so related that there is no possibility of pressure from the combustion chamber being communicated to the passage 26; in other words, the port 26' is closed by the piston before the passage 40 is put into communication with the combustion chamber. In the particular construction shown, the piston closes the port 26' at 57° before inner dead center and the port 40' begins to open 7° later or at 50° before inner dead center.

From the foregoing and speaking in general terms, and with particular reference to the constructions of Figs. 1 to 13, inclusive, it will be understood that mixture supplied to the passage 26 is drawn into the primary compression chamber 25 as the piston moves outwardly away from the crankshaft; that on the return or working stroke the mixture thus drawn into the chamber 25 is at first trapped and thereafter compressed therein; that as this working stroke approaches completion, the outer edge of the piston sweeps over the port 40', thus allowing the compressed mixture to escape into the combustion chamber, it being directed upwardly therein by the baffle 4' to assist in scavenging the previously burned gases; that after the transfer is completed, the piston on its non-working or compression stroke compresses the said mixture in the combustion chamber where it is subsequently fired and from which the burned gases escape after causing the next working stroke.

The operation of this engine will better be understood by reference to the following:—

It is, of course, well known that the power output of internal combustion engines increases with increase of mass of mixture burned per working stroke; and it follows that in the type of engine shown, the power will increase with increase of mixture trapped and compressed in the primary compression chamber per stroke. It is also well known that the amount of gaseous fluid which will pass through orifices or passages subject to like conditions of pressure increases with the size of the passages and with the time they are allowed to remain open. By the arrangement of parts described, it is practical, as previously stated, not only to utilize extraordinarily large effective cross-sections of the passage by which the mixture is supplied, as will be seen by inspection of the drawings, but likewise to substantially increase the period during which the passage may remain open; and it permits also of wide variation in the angles or points at which opening and closing of the passage takes place.

In the particular construction shown, wherein the bore is 2¼" and the stroke 2⅜", the slide valve begins to open (Fig. 5) at 50° before inner dead center; it closes (Fig. 7) at 26° 45' past upper dead center, at which time the valve is moving very fast; it is, therefore, partly or wholly open for a total of 256° 45'. The port 26' is closed by the piston at 57° before inner dead center; it begins to open (Fig. 6) at 57° beyond inner dead center, at which time the piston is moving extremely fast. The slide valve is then well toward full open position and it will be apparent that the primary compression chamber will be rapidly filled and that the filling process, by ramming action of the incoming mixture, will continue until or substantially until the slide valve closes. Thus the induction may be said to take place from the time the port 26' begins to open to the instant the valve 21 closes, or throughout 149° 45'. This angle bears a ratio of more than 1.5 to 1 to the angle during which the supply port can practically be kept open in the construction shown in my above-identified patent; and the total free cross-sectional area of the passage 26 bears to the total free cross-sectional area (in each case taken at intervals of 10° while the corresponding passage is open) of the corresponding port or passage shown in said patent a ratio of about 4.83:1. These angles and quantities are to be regarded merely as by way of example and will, of course vary largely in practice; they will, however, serve to emphasize the very large increase in capacity for induction which is inherent in the invention.

The importance of filling the primary compression chamber as fully as possible will be more apparent from the following considerations: the transfer of mixture from the primary compression chamber to the combustion chamber is dependent on the timing and area of the port 40' (the passage 40 being free and clear i. e. not tortuous, and 40' being the point of greatest restriction) and on the absolute pressure difference as between the primary compression chamber and the combustion chamber. At a running speed of 4000 r. p. m., the port 40' has in the example shown an indicated opening period of only about four one-thousandths of a second, during which the oncoming mixture must enter and also blow out the preceding combusted charge. The timing requirements of the intake port 40' limit its height, and structural limits dictate its circumferential dimension, so that it is pressure and volume of the charge in the primary compression chamber which largely control the rate and volume of charge transferred to the combustion chamber, and ultimately, the power characteristics of the engine, other things such as compression rates and shape of heads being equal.

In the modification shown in Fig. 14, the passage 26 supplies air only, the fuel being supplied by an injection valve 49 of any suitable construction. Such injection valves and their operation are so well known as to require no detailed explanation.

It will be noted that the direction of rotation of the crankshaft is toward the exhaust side of the cylinder. This results in a better seal than would be the case were the ports otherwise disposed. On the working stroke, the side wall pressure of the piston is against the junction of the cylinder intake port and the cylinder wall; in other words, the piston is then pressed against the edges of the hole. On the outward stroke, the piston is caused to bear against the opposite side of the cylinder, thus retarding the drawing back of gases through the exhaust port. The passages 40' and the exhaust ports may be arranged at 90° from the position shown, which simplifies the exhaust manifold.

The device which appears on the left hand side of Fig. 13 will now be described. Therein 50 indicates generally an air admission passage which in the construction shown is partly in the crankcase and partly in the cylinder block and includes a perforation 50' in the valve seat 17. It leads, through the medium of the pipe 51, into the transfer passage 40 at a point beyond the opening of the latter into the primary compression chamber, the outlet of the pipe 51 preferably being about in the mid point of the cross-section of the passage 40 and opening toward the outlet end thereof. The passage 50 is controlled by the valve 21 by which it is opened preferably immediately after said valve closes the passage 26, and by which it is again closed substantially when the piston begins to open the port 40'. The passage 50 is also controlled by a second valve 53 which may be actuated manually directly by the lever 54 or indirectly by a connection 55 from said lever to the lever 56 of the throttle valve 31, (the valve 53 is in open position when the throttle is partly closed, and closes as the valve 31 opens) or it may be of the automatic type, 53a, Fig. 13a arranged to open against the spring 53b when the pressure in the immediately adjoining portion of the passage 50 is less than atmospheric. Somewhat the same result may be gotten from the passage 50" and valve 57 which is positively opened once each cycle against the spring 58 by any suitable means, such as the cam 59 which is rotated by the engine. The positively actuated valve allows the points of opening and cut-off to be selected without regard to each other, which is not the case when the control of the air inlet passage is effected by the valve 21.

It is well known that two cycle engines as usually constructed exhibit some or all of the following faults: inability to run evenly at idle or small load; tendency to stall when the throttle is opened quickly after idling; inability to start after stalling, inflexibility, particularly inability to pick up load after idling; high fuel consumption at low load; spark plug failure; and the creation of objectionable smoke and odor. These deficiencies are present to a lesser extent in engines shown in my above identified patent and certain aspects of their cause, as well as the operation of the passages 50 or 50" and associated ports in the cure thereof will be understood from the following:—Ignoring the passage 50 or 50" and assuming low speed and fractional (or no) load and the piston moving outwardly from inner dead center, (the throttle of course being nearly closed) it is evident that but a small weight of charge is drawn into the primary compression chamber, and that as a result the pressure in the primary compression chamber at the end of the induction stroke is considerably below atmospheric. The piston now moves inwardly through the ignition of a charge previously supplied and the pressure in the primary compression chamber increases, but at the low speeds referred to the absolute pressure even at the end of the stroke may not materially exceed atmospheric and it may even be below atmospheric. In order for the exhausting of the burned charge to take place it is apparent that the pressure in the combustion chamber must be super atmospheric, and it follows that the combustion chamber pressure is, under the conditions stated, higher than that in the transfer passage 40, and that burned gas will flow into said passage. It follows also that only partial scavenging is attained and that the new charge, when it finally enters the combustion chamber as the hot gases therein collapses or more completely escape for whatever reason, is met by residual burned gas in such quantity as to impair or prevent combustion. The character of the mixture is further impaired by the fact that, at the low speeds under consideration, the fuel tends to drop out of suspension and accumulate in the hollows of the induction passages. The result is that if the throttle is then opened the increased flow through the induction passages picks up the accumulated fuel to an extent that the engine "four cycles", that is, fires only on alternate strokes. To illustrate: The engine fires and the products of combustion dilute the next entering charge which fails to fire; the next following (undiluted) charge fires, and contaminates the then next following charge which in turn fails to fire. Oft-times the engine stalls in which case it is not likely to readily start again, partly due to the spark plug becoming wet.

Now all of these conditions are substantially improved by the use of the passage 50 or 50" and associated parts which admit fresh air to the passage 40 under the conditions stated, thereby substantially increasing the pressure under which the incoming charge is projected into the combustion chamber and imposing between the fresh and burned gases a layer or supply of air (which mixes but slightly, if at all, with the fresh charge in the precompression chamber) so that the fresh gases do not pass out directly into the exhaust port, and so that the fresh charge is segregated from the burned gas.

The second valve whereby the passage 50 is controlled, when interconnected with the throttle, is preferably arranged to close rather early in the opening movement of the latter; but it may, as in the case of the automatic form, be dependent for its operation on pressure conditions so as to supply air generally under conditions of low load throughout the entire speed range.

In the engine shown in Figs. 1 to 12 inclusive, the counterbalances on the crankshaft in whirling establish a zone of relatively increased pressure or a succession of pressure puffs in that part of the crankcase adjacent to passages 26 thereby not only hemogenizing the mixture but also tending to increase the quantity delivered to the primary compression chamber. In this construction, however, as in conventional two cycle motors of the type in which the mixture is compressed in the crankcase, and as also in the case of various four cycle engines, there is some tendency for unvaporized fuel to collect in the crankcase when the engine is running at low speeds, a condition which I have overcome by the device shown in Fig. 4. Therein, 60 indicates a drain pipe connected to the lower part of the crankcase and to a fitting 61 which is joined by the pipe 62 to the passage 28 at a point therein beyond the closed position of the throttle. The fitting 61 is also supplied with a riser or air pipe 63, the inner end of which is preferably so related to the adjacent end of pipe 62 as to form therewith an aspirator for atomizing and delivering to the passage 28 under conditions of high suction in the latter (as when the throttle is nearly or partly closed) such fuel as may collect in the crankcase. The air pipe has its outer end extending to a point above the level of such fuel as may accumulate, and preferably serves as part of the collecting reservoir for the fuel. It is obvious that the pipe 60 may lead to any point at which the fuel puddles or collects.

I claim:

1. An internal combustion engine of the two stroke cycle type comprising a cylinder, a piston movable therein dividing said cylinder into a combustion chamber and a primary compression chamber, a passage connecting said chambers and controlled by the piston, a crank, a connecting rod joining said piston and crank, a passage supplying gaseous fluid to the primary compression chamber through the side wall thereof arranged to be completely closed by the piston substantially before the latter reaches inner dead center, and a valve movable with the connecting rod controlling said last named passage at another point.

2. An internal combustion engine of the two stroke cycle type comprising a crankcase, a crankshaft rotatable therein, a cylinder mounted on said crankcase, a valve interposed between said crankcase and said cylinder, a piston in said cylinder dividing the latter into a combustion chamber and a primary compression chamber, a passage connecting the two chambers and controlled by the piston, a connecting rod joining the piston and crankshaft and adapted to actuate the valve, means for supplying gaseous hydrocarbon mixture to the crankcase, and a passage for conducting said mixture from the crankcase to the primary compression chamber through the side wall thereof, said passage being controlled by said piston and by said valve.

3. An internal combustion engine of the two stroke cycle type comprising a crankcase, a crankshaft rotatable in respect thereto, a cylinder mounted on said crankcase, a piston in said cylinder dividing the latter into a combustion chamber and a primary compression chamber, a passage connecting said chambers and controlled by said piston, a shutter valve interposed between said crankcase and said cylinder and closing the end of said compression chamber, a connecting rod joining the piston to the crankshaft and serving to actuate the shutter valve, a passage separate from the crankcase and separate from said first named passage for supplying gaseous fluid to said primary compression chamber, said last-named passage being controlled at one point by said piston and at another point by said shutter valve.

4. An internal combustion engine of the two stroke cycle type comprising a cylinder structure, a piston movable therein dividing said cylinder into a combustion chamber and a primary compression chamber, a passage connecting said chambers, a passage supplying gaseous fluid to the primary compression chamber entering the latter through the curved side thereof and arranged to be completely closed by the piston, said last named passage entering the cylinder structure through the base thereof, and a combined valve and shutter device closing the end of the primary compression chamber and operating to open and close the entrance to the last-named passage once during each complete cycle of the engine.

5. An internal combustion engine of the two stroke cycle type comprising a combustion chamber, a primary compression chamber, a piston separating said chambers, a passage joining said chambers and controlled by said piston, a passage separate from the first named passage and supplying gaseous fluid to said primary compression chamber and opened and closed by said piston at each cycle of the engine, and valve means for opening and closing said last-named passage at another point therein during each such cycle, the opening and closing of said passage by the piston occurring at times different from the opening and closing thereof by said valve.

6. An internal combustion engine of the two stroke cycle type comprising a combustion chamber and a primary compression chamber, a passage connecting said chambers, a passage supplying gaseous fluid to said primary compression chamber, valve means controlling said last-named passage, said valve means including an element opening said passage substantially before inner dead center and an element opening said passage substantially after inner dead center.

7. An internal combustion engine of the two stroke cycle type comprising a combustion chamber and a primary compression chamber, a passage connecting said chambers, a passage supplying gaseous fluid to said primary compression chamber, valve means controlling said last-named passage and including means closing said passage shortly after outer dead center and opening said passage substantially before inner dead center, said valve means also including means closing and opening said passage at equal angles respectively before and after inner dead center.

8. An internal combustion engine of the two stroke cycle type comprising a combustion chamber and a primary compression chamber, a passage connecting said chambers, a passage supplying gaseous fluid to said primary compression chamber, valve means controlling said last-named passage, said valve means including an element closing said passage shortly after outer dead center and an element closing said passage substantially before inner dead center.

9. An internal combustion engine of the two stroke cycle type comprising a combustion chamber and a primary compression chamber, a passage arranged to connect said chambers once during each cycle, a passage supplying gaseous fluid to said primary compression chamber, and valve means closing said last named passage at separate points therealong and at different times in the cycle.

10. An internal combustion engine of the two stroke cycle type comprising a combustion chamber and a primary compression chamber, a passage arranged to connect said chambers once during each cycle, a passage supplying gaseous fluid to said primary compression chamber, and valve means controlling said last-named passage, one of said means including a working piston of the engine and the other a valve movable by a connecting rod corresponding to said piston.

11. An internal combustion engine of the two stroke cycle type comprising a precompression chamber and a combustion chamber, a passage joining said chambers, a piston separating said chambers and controlling said passage, means for supplying fuel and air mixture to the precompression chamber and means for separately supplying air to said passage to be compressed with said fuel and air mixture during the precompressing stroke and prior to said passage being opened by the piston, said last named means including a passage opening into said first named passage in the direction of flow of gas therealong from the precompression chamber to the combustion chamber.

12. An internal combustion engine of the two stroke cycle type comprising a precompression chamber and a combustion chamber, a passage joining said chambers, a piston separating said chambers and controlling said passage, a second passage supplying fuel and air mixture to said precompression chamber, said passage also being controlled by the piston, and means for supplying air to the first named passage in the interval between the time the second named passage is closed by the piston and the time the first named passage is opened by the piston, said means supplying air to said passage in such manner that it is subsequently compressed with said mixture of gas and air during the precompression stroke, said last named means including a passage opening into said first named passage in the direction of flow of gas therealong from the precompression chamber to the combustion chamber.

13. An internal combustion engine of the two stroke cycle type having a precompression chamber and a combustion chamber, a piston therebetween, a passage joining said chambers controlled by said piston, an exhaust passage opposite the outlet from said passage to said combustion chamber, means for supplying fuel and air mixture to said precompression chamber, and means for supplying air to said combustion chamber ahead of the delivery thereinto of fuel and air mixture from said precompression chamber, said last named means including a passage opening into said first named passage in the direction of flow of gas therealong from the precompression chamber to the combustion chamber, the parts being so constructed and arranged that the air thus supplied is compressed with said mixture of gas and air during the precompression stroke.

14. An internal combustion engine of the two stroke cycle type including a cylinder, a shutter closing one end thereof, a piston dividing said cylinder into a combustion chamber and a precompression chamber, an exhaust passage leading from the combustion chamber, a connecting rod for said piston actuating said shutter, a first passage joining said chambers and controlled by the piston, a second passage controlled by the shutter for supplying a mixture of fuel and air to said precompression chamber, and a third passage supplying air to said first passage as the burned gases pass out through the exhaust passage.

15. The construction of claim 14 but in which said third passage is also controlled by said shutter.

16. The construction of claim 14 plus means to positively open and close said third passage near the end of the working stroke of the piston.

17. An internal combustion engine of the two stroke cycle type comprising a cylinder, a piston therein, a passage leading to a point in said cylinder uncovered by the piston near the end of its working stroke, means for simultaneously compressing a mixture of fuel and air and an additional supply of air, and means for first supplying said additional air and thereafter said mixture of air and fuel through said passage, said last named means including a passage opening into said first named passage in the direction of flow of gas therealong from the precompression chamber to the combustion chamber.

18. An internal combustion engine of the two stroke cycle type, comprising a cylinder, a piston therein, a passage leading to a point in said cylinder uncovered by the piston near the end of its working stroke, a second passage supplying air to said first passage, a third passage through which a mixture of fuel and air is supplied to said first named passage, a throttle for said third passage, the opening through the second passage varying with the position of said throttle.

19. An internal combustion engine of the two stroke cycle type comprising a crankcase and a cylinder, means for supplying fuel mixture to the crankcase, means for transferring such mixture to the cylinder, means for collecting fuel which condenses in the crankcase and for returning it to the means through which it was initially supplied to the crankcase, said last named means including a fuel receiving chamber and three passages leading therefrom, one joining said chamber to the crankcase, another joining said chamber to the fuel mixture supplying means, and the third opening to the atmosphere above the level of fuel collected in said chamber.

20. An internal combustion engine of the two stroke cycle type comprising a crankcase and a cylinder arranged to be supplied with fuel mixture therefrom, a passage supplying fuel mixture to said crankcase, a throttle therein, and means for returning to said mixture passage fuel collected in said crankcase, said means comprising a passage connected to said crankcase at a low point therein and connected also to said mixture passage at a point beyond the throttle, said means also comprising a passage opening into the second named passage at a low point therein and also opening into the atmosphere at a higher point.

21. An internal combustion engine of the two stroke cycle type including a crankcase and a cylinder, a passage supplying fuel and air mixture to said crankcase, a throttle for said passage, means for collecting fuel which condenses in the crankcase, mixing it with fresh air and returning it at high velocity to said passage at a point beyond the throttle.

22. An internal combustion engine of the two stroke cycle type comprising a cylinder, a piston movable therein dividing said cylinder into a combustion chamber and primary compression chamber, a passage connecting said chambers and controlled by the piston, a crank, a connecting rod joining said piston and crank, a passage supplying gaseous fluid to the primary compression chamber through the side wall thereof and controlled by the piston, and a valve movable with the connecting rod controlling said last named passage at another point, the distance from the inlet to the primary compression chamber from the axis of the crank shaft being greater than the distance from the outlet of the primary compression chamber to the axis of the crank shaft.

23. An internal combustion engine of the two stroke cycle type comprising a combustion chamber and a primary compression chamber, a passage connecting said chambers, a passage separate from the first named passage and supplying fluid directly to said primary compression chamber, valve means including a device opening said last named passage substantially before inner dead center and a piston valve opening said last named passage substantially after inner dead center.

24. An internal combustion engine of the two stroke cycle type comprising a combustion chamber, a primary compression chamber, a passage connecting said chambers, a passage separate from the first named passage, entering the primary compression chamber through a curved side wall thereof, a piston movable in said primary compression chamber across the end of said second named passage, a valve movable across said second named passage at another point therein; the parts being interconnected so that the valve moves at its highest speed when the piston is at the end of its stroke and so that the piston moves at its highest speed when the valve is at the middle of its stroke.

25. An internal combustion engine of the two stroke cycle type comprising a cylinder structure, a piston movable therein dividing said cylinder into a combustion chamber and a primary compression chamber, a passage connecting said chambers, a passage separate from said first named passage, for supplying gaseous fluid to the primary compression chamber and entering the latter through the curved side thereof, said second named passage being closed and opened by said piston at substantial angles respectively before and after inner dead center, and a movable valve by which said second named passage is also opened and closed, the parts being interconnected so that the valve moves at high speed when the piston is at the end of its stroke.

26. An internal combustion engine of the two stroke cycle type comprising a combustion chamber and a precompression chamber, a passage joining said chambers, means for supplying a mixture of fuel and air to said precompression chamber, a piston movable in said combustion chamber and controlling said passage, a movable shutter for said precompression chamber, and means for supplying air to said passage.

27. An internal combustion engine of the two stroke cycle type comprising a precompression chamber and a combustion chamber, a passage joining said chambers, a piston separating said chambers and controlling said passage, a second passage supplying gaseous fluid to said precompression chamber, a movable shutter closing the end of said precompression chamber, and means for supplying air to said first named passage in addition to fluid supplied thereto from said precompression chamber.

28. An internal combustion engine of the two stroke cycle type comprising a cylinder, a movable shutter closing one end of the cylinder, a piston dividing the cylinder into a combustion chamber and a precompression chamber, a passage joining said chambers, said piston controlling said passage, and means, including said precompression chamber, for first supplying air and thereafter a mixture of air and fuel through said passage to said combustion chamber.

29. An internal combustion engine of the two stroke cycle type comprising a cylinder, a piston movable therein dividing said cylinder into a combustion chamber and a primary compression chamber, a passage connecting said chambers and controlled by the piston, a crank, a connecting rod joining said piston and crank, a passage at times completely closed by the piston and supplying air to the primary compression chamber through the side wall thereof, a valve movable with the connecting rod controlling said last named passage at another point, and a fuel injection device for supplying fuel to said combustion chamber.

30. An internal combustion engine of the two stroke cycle type comprising a cylinder, a piston movable therein dividing said cylinder into a combustion chamber and a primary compression chamber, a passage connecting said chambers and controlled by said piston, a crank, a connecting rod joining said piston and crank, a valve movable with the connecting rod for admitting air to the precompression chamber, and a fuel injection device for supplying fuel to said combustion chamber.

JAMES B. WATSON.